United States Patent [19]

Moore

[11] Patent Number: 4,958,304

[45] Date of Patent: Sep. 18, 1990

[54] COMPUTER WITH INTERFACE FOR FAST AND SLOW MEMORY CIRCUITS

[75] Inventor: Robin B. Moore, Fremont, Calif.

[73] Assignee: Apple Computer, Inc., Cupertino, Calif.

[21] Appl. No.: 405,397

[22] Filed: Sep. 12, 1989

Related U.S. Application Data

[63] Continuation of Ser. No. 20,599, Mar. 2, 1987, abandoned.

[51] Int. Cl.5 .......................... G06F 3/14; G06F 15/20

[52] U.S. Cl. .................................... 364/521; 364/900; 364/927.2; 364/964.2; 364/964

[58] Field of Search ... 364/200 MS File, 900 MS File, 364/521, 518; 340/799, 801, 802, 798

[56] References Cited

U.S. PATENT DOCUMENTS

| | | | |
|---|---|---|---|
| 3,231,863 | 1/1966 | Ulfsparre | 364/200 |
| 4,110,823 | 8/1978 | Cronshaw et al. | 364/200 |
| 4,150,364 | 4/1979 | Baltzer | 340/703 |
| 4,298,931 | 11/1981 | Tachiuchi et al. | 364/200 |
| 4,366,540 | 12/1982 | Berglund et al. | 364/200 |
| 4,388,621 | 6/1983 | Komatsu et al. | 340/802 |
| 4,435,775 | 3/1984 | Brantingham et al. | 364/900 |
| 4,484,261 | 11/1984 | Brantingham | 364/200 |
| 4,486,856 | 12/1984 | Heckel et al. | 364/900 |
| 4,511,965 | 4/1985 | Rajaram | 364/200 |
| 4,609,996 | 9/1986 | Kummer | 364/900 |
| 4,628,467 | 12/1986 | Nishi et al. | 364/521 |
| 4,639,721 | 1/1987 | Eto et al. | 340/747 |
| 4,682,297 | 7/1987 | Iwami | 364/521 |
| 4,747,081 | 5/1988 | Heilveil et al. | 365/219 |
| 4,780,712 | 10/1988 | Itaya et al. | 340/747 |
| 4,791,580 | 12/1988 | Sherrill et al. | 364/521 |

*Primary Examiner*—Eddie P. Chan
*Assistant Examiner*—Kevin A. Kriess
*Attorney, Agent, or Firm*—Blakely, Sokoloff, Taylor & Zafman

[57] ABSTRACT

A CPU with an interface to two different RAMs which operate at different rates. The interface circuit includes a decoder which examines the addresses from the CPU and determines whether a faster cycle or slower cycle is needed. The slow RAM provides video signals to a video display. The fast RAM includes an image of the video signals stored in the first RAM. When the video signals are read by the CPU, they are read only from the fast RAM, however, when it is necessary to update the video signals, they are written into both the slow and fast RAMs.

15 Claims, 9 Drawing Sheets

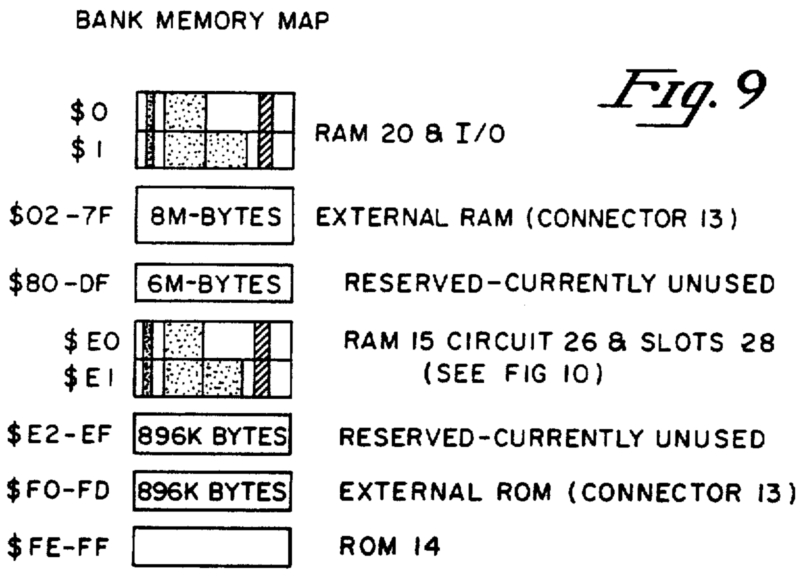
Fig. 9
Fig. 10
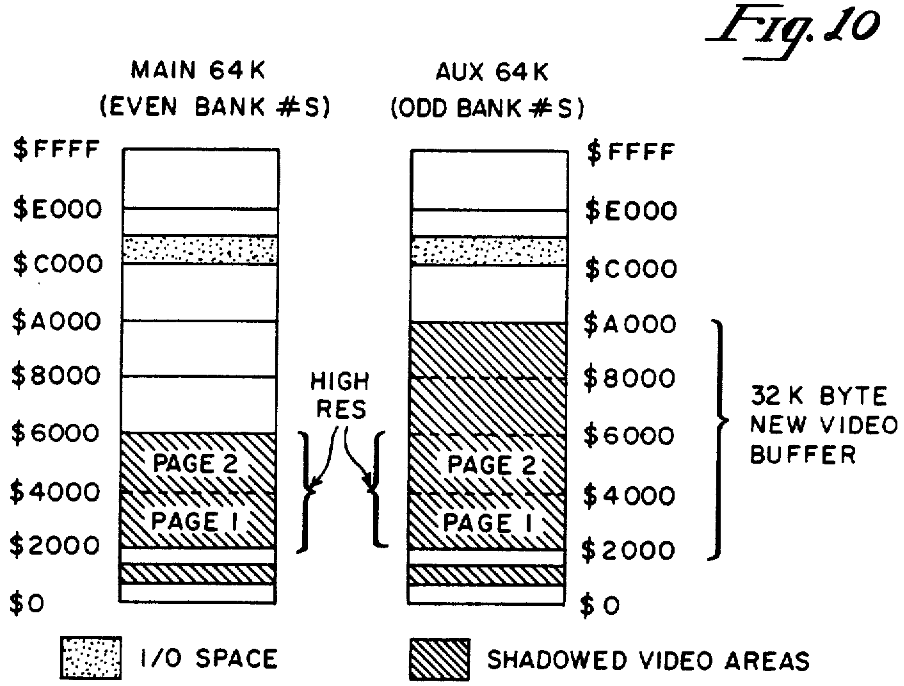

FIG. 11 SHADOW REGISTER
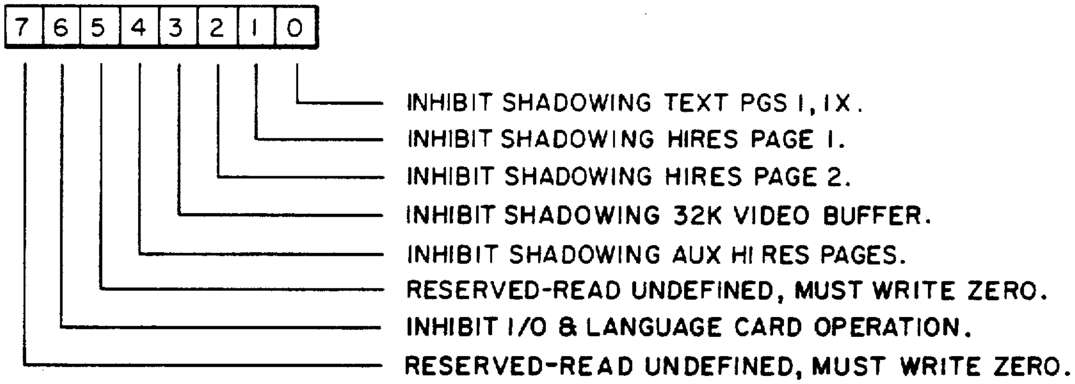
FIG. 12 GENERAL PURPOSE REGISTER
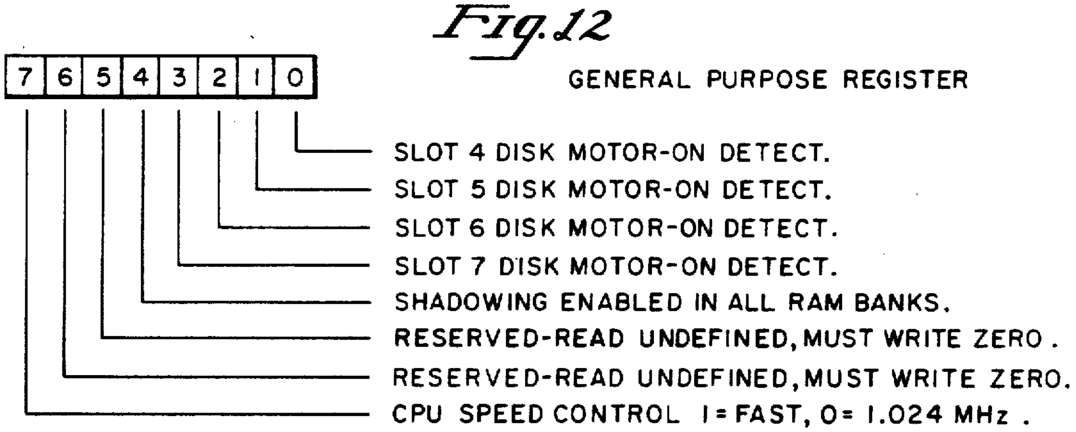

Fig. 13 SLOT ROM REGISTER
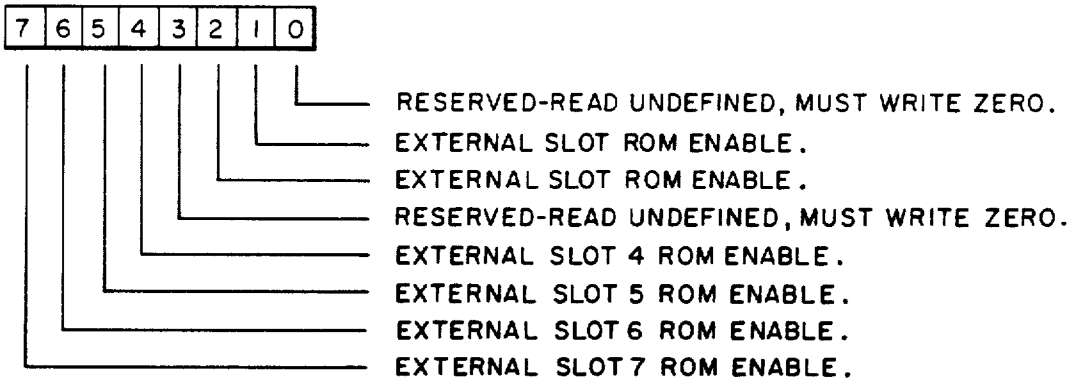
Fig. 14 SOFT SWITCHES
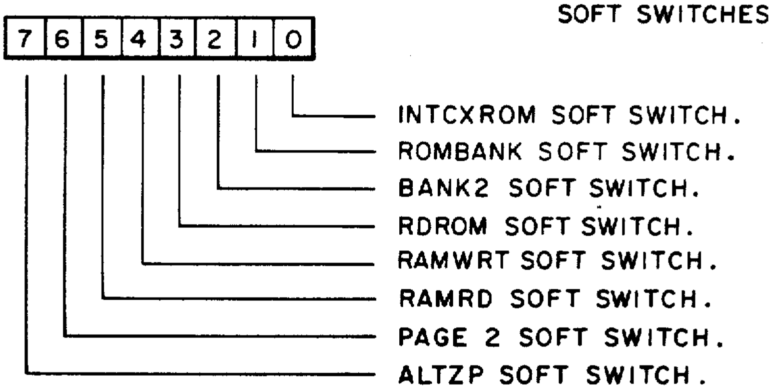

COMPUTER WITH INTERFACE FOR FAST AND SLOW MEMORY CIRCUITS

This is a continuation of application Ser. No. 020,599, filed Mar. 2, 1987, now abandoned.

BACKGROUND OF THE INVENTION

1. Field of the Invention

The invention relates to interface circuits for central processing units of digital computers.

2. Prior Art

More has been written about the Apple II series computers than perhaps any other computer. Beginning in the late 1970's with the introduction of the Apple II computer, followed by the Apple II+, Apple IIe, and Apple IIc, these computers have found wide application in education, science, business and the home. In addition to the voluminous texts, there are literally thousands of commercially available computer programs for the Apple II series computers.

The initial Apple II computer used a central processing unit (the 6502) which operated at a rate of 1 mHz. The computer included a read-only memory (ROM) and a random-access memory (RAM). The RAM stored data for the video display. The 1 mHz timing was used for all ROM and RAM access cycles including accessing by the video circuits for the display. A unique timing mechanism was also used which "stretched" certain timing signals to prevent a phase reversal between the color reference signal and the color video signal (see U.S. Pat. No. 4,136,359). For other aspects of the Apple II computer, see U.S. Pat. Nos. 4,210,959 and 4,278,972.

Since the introduction of the first Apple II computer, substantial progress has been made in semiconductor technology. Microprocessors or central processing units (CPUs) are commercially available which operate at much faster rates with larger data words and addresses.

The present invention deals with the problem of adapting a faster CPU to an Apple II computer. The video timing of the Apple II computer makes it difficult to adapt a faster CPU to the circuitry of the Apple II computer if compatibility with existing programs and certain hardware is to be maintained.

As will be seen, the present invention provides a CPU interface with allows a faster CPU to be "mated with" the slower cycle times associated with the Apple II series computer while still taking advantage of the greater capacity of the faster CPU.

SUMMARY OF THE INVENTION

A computer which provides a video signal for a display and includes a unique interface circuit is described. The central processing unit (CPU) executes a program at the faster cycle time. The CPU communicates with a first random-access memory (RAM) at the slower rate and a second RAM at the faster rate. The first RAM is accessed a the second (slower) rate by video circuits to generate the video signal. The interface circuit includes a decoder which decodes the addresses from the CPU and determines which of the memories is to be accessed. An image of the video data is stored in both the first and second RAMs. When the data is read by the CPU for purposes of updating the display, it is read only from the second RAM (at the faster rate). Since typically many more read cycles of the video data are needed compared with the number of write cycles, substantial time is saved by operating at the faster rate. Moreover, the CPU can execute the program at the faster rate from the second RAM.

Other aspect of the present invention will be apparent from the detailed description.

BRIEF DESCRIPTION OF THE DRAWINGS

FIG. 9 shows the bank memory mapping used in the currently preferred embodiment.

FIG. 10 shows the memory space used on the slower side of the computer.

FIG. 11 describes the contents of the shadow register of the interface circuit.

FIG. 12 describes the contents of the general purpose register of the interface circuit.

FIG. 13 describes the contents of the slot ROM register of the interface circuit.

FIG. 14 describes the contents of the soft switches of the interface circuit.

DETAILED DESCRIPTION OF THE INVENTION

A computer with its interface circuit which permits operations at two different rates is described. In the following description, numerous specific details are set forth such as specific cycle times, mapping, bit designations, etc., in order to provide a thorough understanding of the present invention. It will be obvious, however, to one skilled in the art that the present invention may be practiced without these specific details. In other instances, well-known circuits are not set forth in detail so that the present invention is not unnecessarily obscured.

OVERVIEW OF THE PRESENT INVENTION

Figure 1:
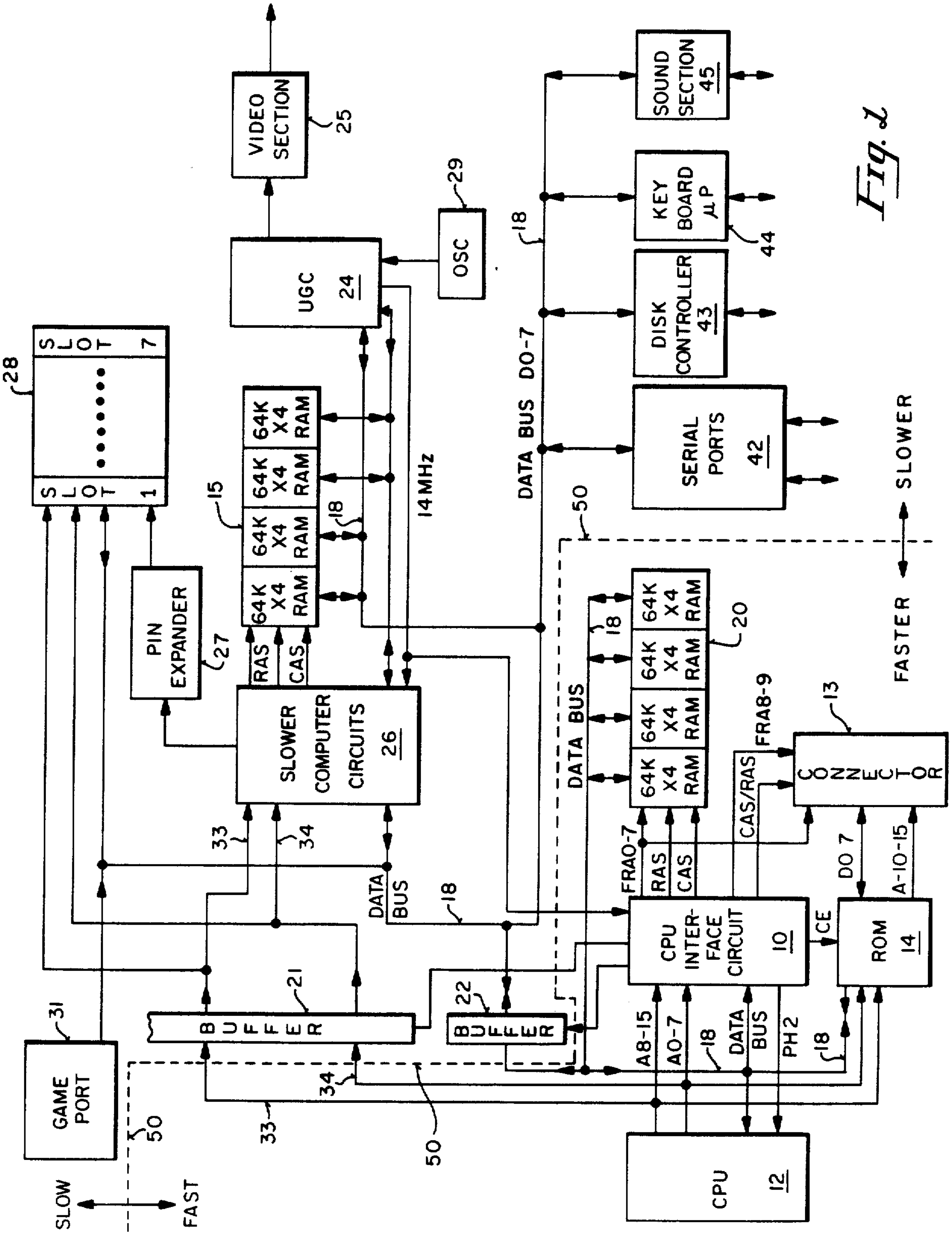
FIG. 1 is a block diagram of a computer which includes the present invention; the diagram illustrate the "faster side" and "slower side" of the computer.

Referring first to FIG. 1, the dotted line 50 serves to separate the computer (for purposes of explanation) into a faster side and slower side. That portion of FIG. 1 to the right of and above line 50 is referred to as the slower side of the computer; the portion to the left of and below line 50 as the faster side.

The CPU 12 which in the currently preferred embodiment is a 65C816 operates at a clock rate of 2.8 mHz, approximately 3 times faster than the 6502 initially used in the Apple II computer. The CPU interface circuit 10 is coupled to the CPU 12 and provides control for the faster cycles and slower cycles by varying the timing of the CPU clock signal PH2. The computer includes two RAMs, the first RAM 15 operates at the slower rate and a second RAM 20 operates at a faster rate. While programs may be executed by the CPU from either RAM 15 or 20, they are generally executed from RAM 20 to take advantage of the RAM's faster cycle times. (RAMs 15 and 20 are both DRAMs fabricated from the same "chips"; thus it is not the inherent rate at which the RAMs can be accessed that determines the slower and faster rate, but rather the rates at which they are accessed under control of the circuit 10.)

The video data read for generation of the video signal is stored in RAM 15; this data is read under the control of the slower computer circuits 26 and through the video graphics controller 24 and video section 25 provides the video signal. An image of this video data is also stored in the fast RAM 20. A "shadow"0 of the data is stored, hence the name shadow cycles is used to identify cycles for writing this shadow into memory. When the CPU 12 is executing a program and needs to read the video data (for example, to update it), the circuit 10 causes the data to be read only from the RAM 20. When new video data for the display is computed, it is written into RAM 20, then into RAM 15 in a shadow cycle. Since there are substantially more read cycles than write cycles associated with the video data, substantial time is saved in updating the display in this manner.

PREFERRED EMBODIMENT OF THE COMPUTER

1. Computer Layout

A. Fast Side

Referring to FIG. 1, the fast side of the computer comprises the CPU 12, CPU interface circuit 10, the RAM 20, read-only memory (ROM) 14, a connector 13, and interconnecting bused and lines.

The CPU 12, as mentioned, is a commercially available microprocessor, the 65C816. The CPU 12 is coupled to the 8 bit data bus 18 and the address buses 33 and 34. As shown, address bus 34 receives the address signals AO–8, while address bus 34 receives the address signals A8–15. Eight additional "bank" address bits are multiplexed over the data bus. The PH2 (2.8 mHz) clock signal is coupled to the CPU 12 from the interface circuit 10. This timing signal is generated from oscillator 29 found in the slower side of the computer and is derived from the 14 mHz signal. The read-only memory (ROM) 14 in the presently preferred embodiment has a capacity of 128 K. This ROM stores a monitor program which performs such functions as initialization, etc. These functions are similar to those perfomed by the system monitor (F8) used in the Apple II computer. Other programs, such as "Apple QuickDraw" are also stored in this ROM. The ROM is coupled to the data and address buses. Expansion ROM can be provided at the connector 13 and thus address signals A10–A15 as well as the data bus are shown coupled to the connector 13. Addresses FRAO-9 and CAS/RAS, discussed later are also coupled to connector 13.

The CPU interface circuit 10 is described in detail with use of FIGS. 2, 5 and 8, and certain timing is described in connection with FIGS. 6 and 7. In general, as mentioned, it is the interface circuit 10 which determines if a faster or slower cycle is needed, and then controls the computer appropriately. This determination is made by decoding the address signals and examining certain flags ("soft switches"), within the circuit 10, which are set by signals sent over the data bus.

The fast RAM 20 is fabricated from ordinary 64 K dynamic RAMs. It is organized as shown in four sections of 64 K×4 bits. It is addresses from the circuit 10 by the FRAO-7 address bits (faster RAM address). Accessing of the memory from the bus 18 is controlled in an ordinary manner by the row address strobe (RAS) and column address strobe (CAS) from circuit 10. (These signals, the chip enable signal to ROM 14 as well as the CAS and RAS signal to the connector 13, are shown in FIG. 8.)

The computer of FIG. 1 (faster and slower side) is fabricated on a "motherboard" and includes slots and connectors for receiving external cards. The connector 13 in the currently preferred embodiment is a 44 pin, edge connector for receiving expansion memory (RAM or ROM) for access at the faster rate. (As with the entire block diagram of FIG. 1, certain control signals, power lines, grounding lines which are well-known and are not needed for an explanation of the present invention are not shown or discussed.)

B. Slower Side

The slower side of the computer is very much like the prior art Apple II computer, except, of course, it does not include a CPU. The slower side of the computer uses CPU 12 which operates at the fast rate. For the most part, there is a one-to-one correlation between many of the circuits on the slower side of the computer and the Apple II computer, except for the video graphics controller 24. The video graphic controller is described in copending application, Ser. No. 906,753, filed Sept. 12, 1986, entiled ENHANCED VIDEO GRAPHICS CONTROLLER, (and assigned to the assignee of the present invention).

The slower side of the computer communicates with the data bus 18 through bidirectional buffer 22 and the address buses 33 and 34 through the buffer 21. Both these buffers receive control signals from the CPU interface circuit 10. The slower side includes a game port 31 for coupling to a joystick. Coupled to the data bus 18 on the slower side is a circuit 42 for providing serial communications (e.g., 26LS30/32). A disk controller 43 permits communications with a disk system. A keyboard microprocessor 44 (e.g., 50740 A) which is coupled to a keyboard, provides scanning as is well- known. The sound section 45 is used for developing audio signals.

The slots 28 are similar to the slots on Apple II computers (excluding the Apple IIc), and comprises seven 50-pin edge connectors for receiving circuit boards. The pin expander 27 provides decoding and timing signals for the slots as is well-known. The slots, of course, communicate with the data and address buses.

The slower computer circuits 26 contain many of the logic circuits found in the current Apple IIe computer. These are control and video circuits all of which are well-known in the art. Additionally, these circuits include means for generation of a RGB signal in a manner described in copending application, Ser. No. 785,220, filed Oct. 7, 1985, entitled METHOD AND APPARATUS FOR GENERATING RGB COLOR SIGNALS FROM COMPOSITE DIGITAL VIDEO SIGNAL, (and assigned to the assignee of the present invention).

The oscillator 29 provides timing signals for both the faster and slower side, and as mentioned, provides a 14 mHz signal to the interface circuit 10.

The RAM 15 is organized in a similar manner to RAM 20 and is fabricated again from 64 K dynamic memories and organized in four section of 64 K×4. The RAS and CAS signals are generated within circuits 26. Refresh control is also maintained by circuit 26.

2. FAST CYCLE/SLOW CYCLE TIMING AND TYPES

Figure 3:
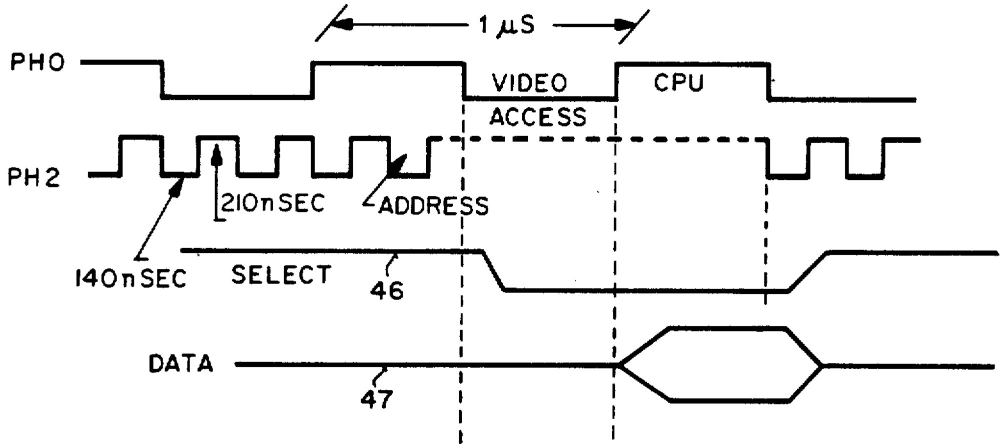
FIG. 3 is a timing diagram showing the faster cycle and slower cycle timing signals.

As mentioned, the RAM 15 of FIG. 1 is accessed at a slower rate so that compatibility is maintained with peripherals and displays of video Apple II series computers. In FIG. 3, the PHO waveform derived from the oscillator 29 output controls the slower cycles for the slower side of the computer. This 1 mHz signal (actual) period 980 nsec.) has two states. During the low state, the video circuitry accesses RAM 15 to provide the video signal; and, during the high state, the CPU has access to the RAM 15.

The faster side of the computer is controlled by the PH2 signal. This approximately 3 mHz signal has a low state of 140 nsec. When addresses are tansmitted by the CPU and a high state of 210 nsec. for data transfer.

Assume now that the CPU 12 needs to access the RAM 15, for instance, to write video data into the RAM 15 during a shadow cycle. The CPU interface circuit 10 determines when this is necessary and then provides a select signal having the waveform 46. When this occurs, the CPU is put in a hold mode and in effect the PH2 signal is then synchronized with the PHO signal. During the next PHO signal, as shown by line 47, data is accepted from the CPU through the buffer 22 and into the slow RAM 15. Thereafter, the CPU continues to operate at the faster rate under control of the PH2 signal. Note that the PH2 signal is not otherwise synchronized with the PHO signal.

Figure 4:
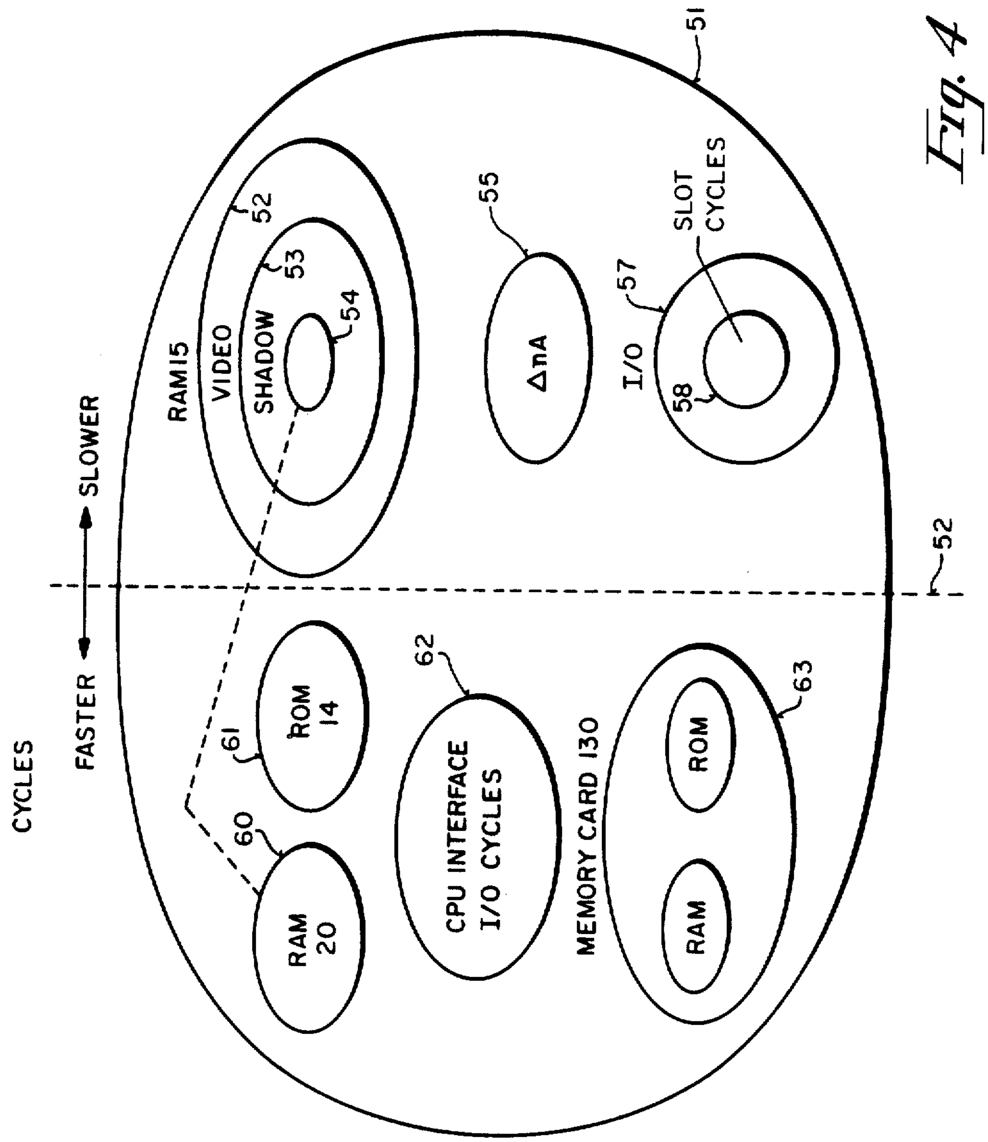
FIG. 4 is a diagram used to illustrate different types of faster cycles and slower cycles.

FIG. 4 illustrate the type of faster cycles and slower cycles for the computer. The various cycles are all enclosed within ellipse 51. The slower cycles are shown to the right of dotted line 52 and the faster cycles to the left of dotted line 52. On the slower side, the RAM 15 cycles are shown within the ellipse 52. Some of the cycles associated with RAM 15 are for the video display and those are shown within the ellipse 53. A subset of these are identified by ellipse 54 as shadow cycles. These cycles also write data into the display image in RAM 20. Another type of slower cycles are for direct memory access (DMA), and these are shown by ellipse 55. Another category of slower cycles not associated with the memory are the input/output cycles represented by circle 57. These can include, for example, inputs from the game port, keyboard, etc. A subset of these are the slot cycles for the slots 28 of FIG. 1, represented by circle 58.

On the faster side, the fast cycles include fast memory access cycles to the RAM 20 represented by ellipse 60 and fast cycles to the ROM 14 represented by ellipse 61. The ellipse 62 illustrates the faster cycles associated with the interface circuit. For example, there are registers shown in FIG. 5 which are addressable and receive data under control of the circuit 10's decoder. Additionally, these cycles include setting of the soft switches. The cycles associated with the connector 13 are represented by the ellipse 63 and identified as memory card 130 cycles. They include RAM cycles and ROM cycles, since, as mentioned, the expandable memory for connector 13 can include RAM or ROM.

The dotted line connecting ellipses 60 and 54 indicates that there are two memory cycles for shadowed video data, that is, it is written in both RAMs.

3. CPU INTERFACE

Figure 2:
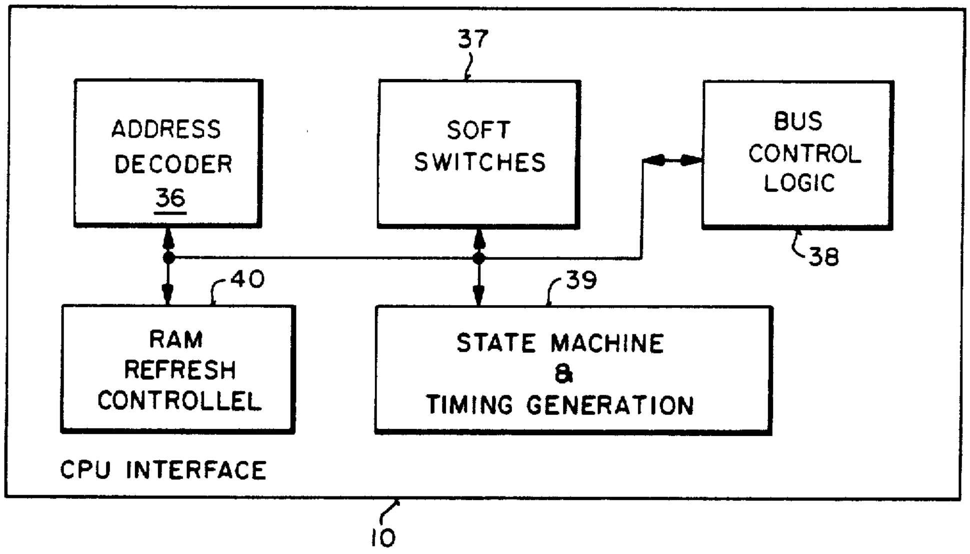
FIG. 2 is a general block diagram of the CPU interface circuit.

First, referring to FIG. 2, the major functional blocks of the CPU interface are illustrated as the address decoder 36, soft switches 37, bus control logic 38, RAM refresh controller 40 and the state machine and timing generation 39.

In general, the address decoder 36 receives the address signals and then decodes then to select one of the cycles of FIG. 4. The specific address range for the bank mapping is shown in FIG. 9. The soft switches 37 are flags which are set through software to indicate certain conditions within the computer. Many of the flags serve the same function as used in the Apple II computer.

Figure 5:
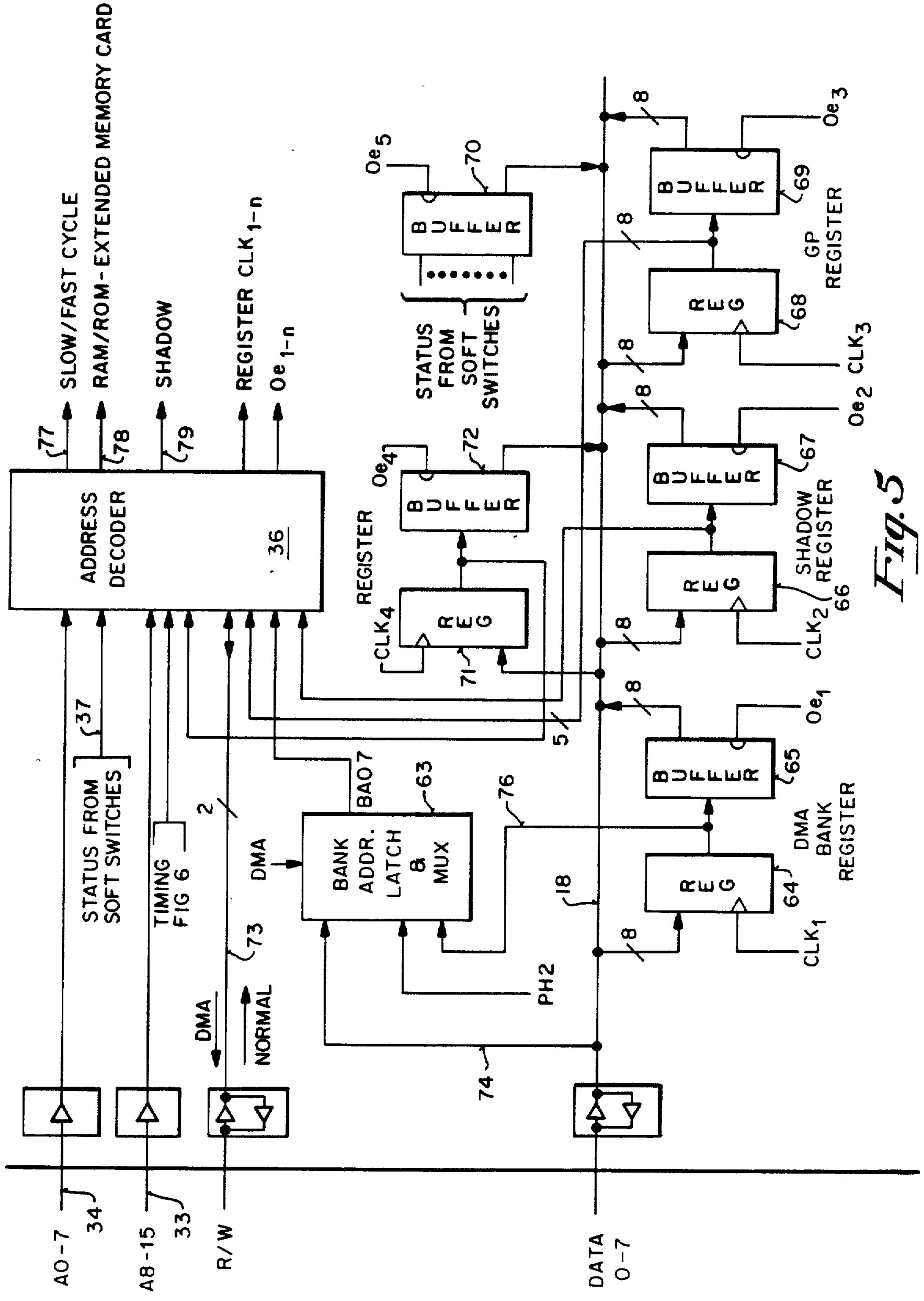
FIG. 5 is a more detailed block diagram of portions of the CPU interface circuit.
Figure 6:
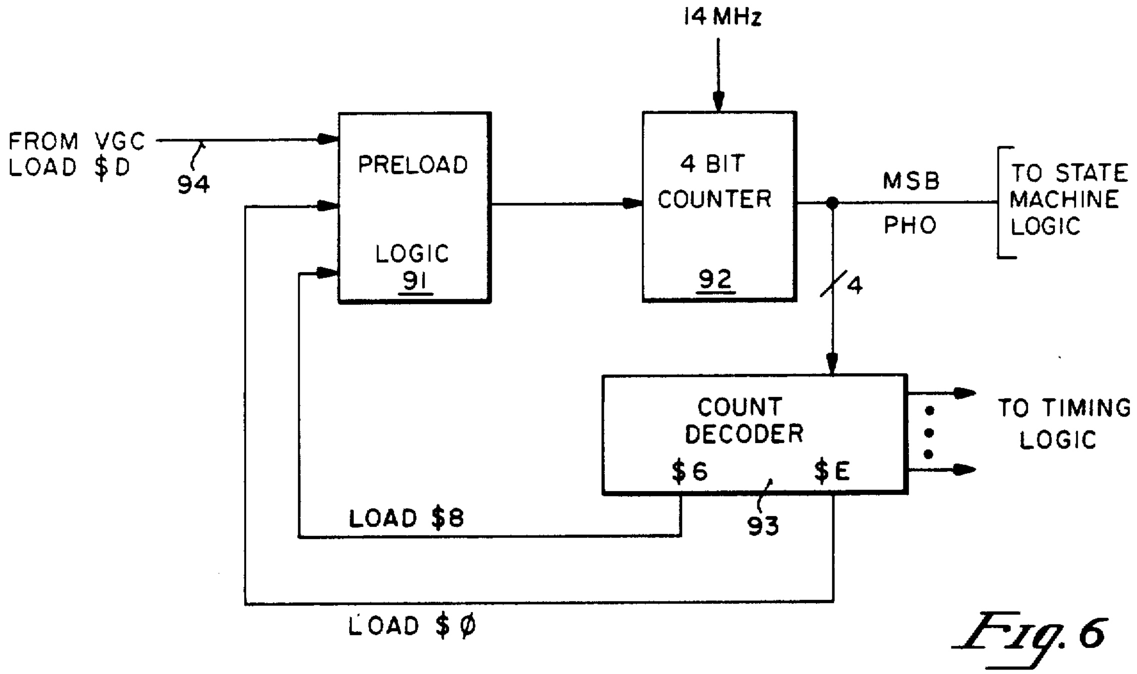
FIG. 6 is the portion of the CPU interface circuit which provides synchronized timing with the slower side of the computer for certain operations.

The bus control logic 38 controls various signals on the bus and other signal flow which will be more apparent from FIG. 5. The RAM refresh controller 40 performs the well-known function of providing refresh signals for the dynamic RAM 20. This controller is not described since it is not needed to understand the present invention. The state machine and timing generator performs the basic control function for the interface circuit. A portion of the timing circuit pertinent to the present invention is described in conjunction with FIG. 6.

The portion of the CPU interface circuit 10 of FIG. 5 again shows the address decoder 36. The decoder receives the address signals AO–7 (bus 34) and A8–15 (bus 33). The timing signals from FIG. 6 are also applied to the decoder 36. The decoder 36 receives two read/-write control signals during normal operation on lines 73. During DMA operations, these lines function as bidirectional lines and read/write signals are provided by the decoder itself.

As mentioned, 8 additional bits of an address are provided on data bus 18. These address bits are coupled to the address decoder from the bus 18 via lines 74 through the bank address latch and multiplexer 63. The latching of these addresses is controlled by the PH2 clock. During DMA operations, the DMA signal causes the multiplexer 63 to select addresses from the register 64.

There are a plurality of registers coupled to the address bus 18. These registers receive data from the bus 18 under the control of the address decoder 36. The information from these registers is then coupled through the data bus to various portions of the computer.

The register 64 is the DMA bank register, the output of which as already mentioned is coupled through the multiplexer 63 on line 76 to the decoders. The CLK1 signal causes the register to read information from bus 18. The information is returned to the bus 18 via buffer 65 on command of the output enable (OE1) signal.

The shadow register 66 contains data which controls accessing of RAM 15. The specific signals stored in register 66 are shown in FIG. 11. The mapping of FIG. 10 shows the shadowed video areas. The signals in register 66 are returned through buffer 67 to bus 18 on command of the OE2 signal.

The general purpose register 68 stores various signals under control of the CLK3 signal and returns these signals to the bus 18 via buffer 69 on command of the OE3 signal. The signals stored in this register are shown in FIG. 12.

The SLOT ROM register 71 contains signals that are used to determine whether to read data from each I/O slot or its corresponding addresses in ROM. The contents of register 71 are coupled to the bus 18 through the buffer 72 on command of the OE4 signal. The signals contained in this register are shown in FIG. 13.

The buffer 70 is coupled to the soft switches and permits the status of these switches to be read onto bus 18 on command of the OE5 signal. FIG. 14 shows the function of these signals.

In operation, the addresses from the CPU which are coupled to the decoder 36 include addresses which are recognized by the decoder as addresses of the registers 64, 66, 68, and 71. The specific addresses are set forth in Table 1. The decoder 36 provides the appropriate signal, CLK 1-N to the register to permit the data to be read from the bus 18 into the register. The contents of these registers is coupled to the decoder 36 for decoding and is used in selecting the appropriate cycle. The decoder also recognizes the read/write signal which determines correct action (e.g., write into or read from the register) to be read through their respective buffer back onto the data bus. This is implemented through the decoder by the OE1 -N signals.

TABLE 1

| Address | Contents | Function |
|---|---|---|
| $CO2D | Slot ROM Register | Controls Internal/external device selection |
| $CO35 | Shadow Register | Controls which display areas are shadowed |
| $CO36 | General Purpose Register | Controls speed, disk motor detect, and shadow enable in all banks |
| $CO37 | DMA Bank Register | Holds upper 8-bits of DMA address |
| $CO68 | Soft Switches | Map eight switches to an 8-bit R/W Reg. |

An output of the decoder selects slower or faster cycle as indicated by line 77. Another output (line 78) selects the RAM 20 or ROM 14 as opposed to the extended memory card for connector 13. The output on line 78 selects the shadow memory cycle. Other outputs of the decoder are described in conjunction with FIG. 8.

The interface circuit 10 provides control signals for the buffer 22. The signals consist of a directional signal to indicate which direction data will flow through the buffer and an enable signal. As implemented, data is always enabled through the buffer 22 even if it is not needed on the slower side of the computer, except during DMA operations through the circuit 26. The capacitance of the bus itself is relied upon to store charge during the latter part of the slower memory cycle when data is being written into the RAM 15 or otherwise transferred into the slower side of the computer. There is, in effect, a "sample and hold effect" on the bus. (Thus, special timing signals are not required to the buffer 22 for the slower memory cycles.). The buffer 21 is also always driven except for DMA operations. Even though these buffers are driven when addresses/data are not being transferred to/from the slower side does not mean the data is "accepted" on the slower side. Enable signals, select signals, address signals prevent "acceptance" of the data.

Figure 8:
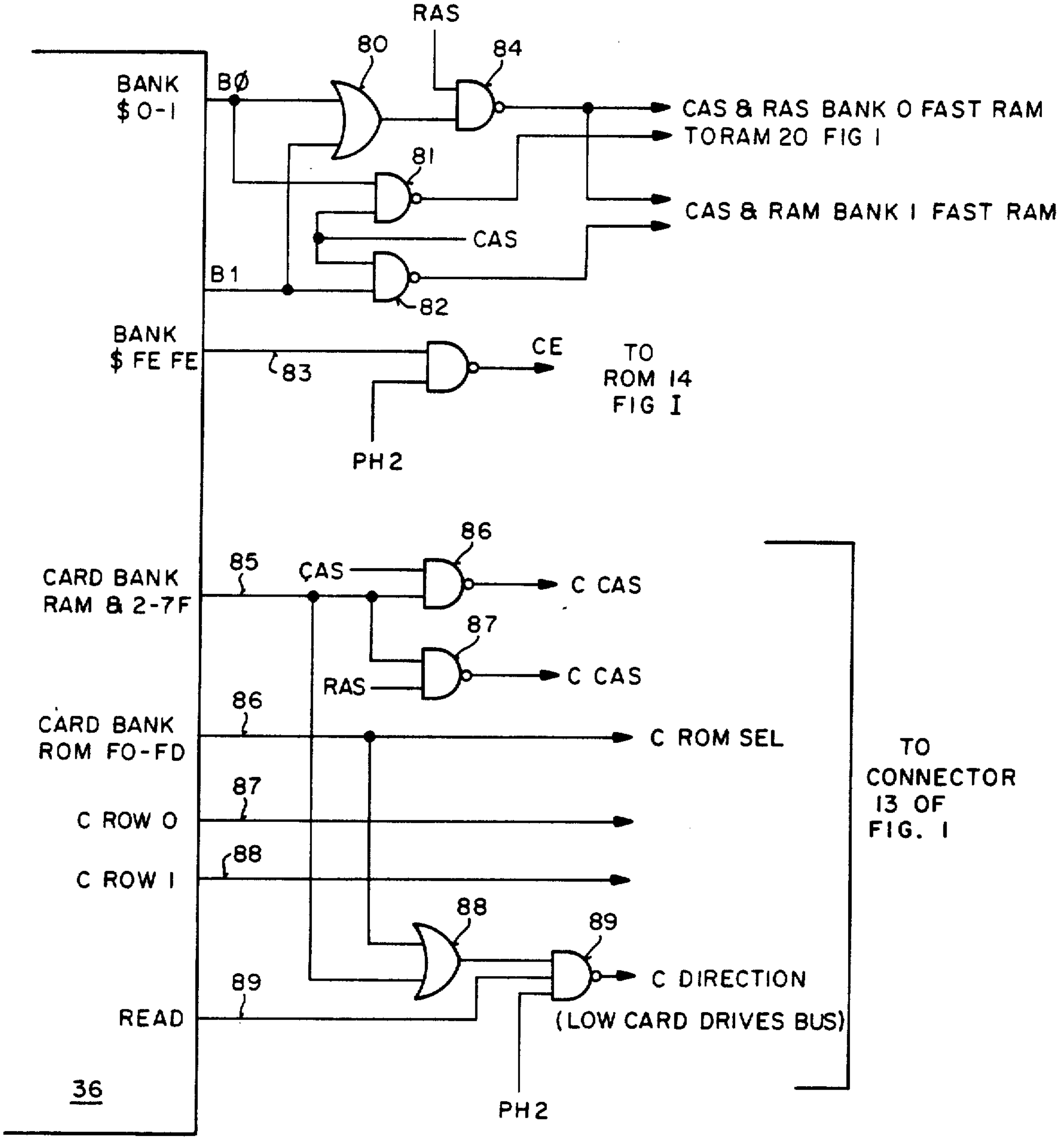
FIG. 8 illustrates some outputs from the CPU interface circuit and logic circuits associated with these outputs.

FIG. 8 illustrates the CAS and RAS control signals from the decoder 36 for the RAM 20 and ROM 14 and the RAM and ROM connected to the connector 13. Also chip enable signals are shown, one for enabling ROM 14 and another for enabling selection of ROM connected to the connector 13.

The bank select signals B0 and B1 are coupled through the gates 80, 81, 82 and 84 along with a CAS and RAS signal to provide CAS and RAS signals for bank 0 and bank 1 of RAM 20 of FIG. 1. The bank select signal on line 83 is gated by the PH2 signal to provide the chip enable signal for selection of the ROM 14. The remaining signals on lines 85, 86, 87, 88 and 89 are all coupled through gates 86, 87, 88 and 89 as shown to the connector 13 of FIG. 1. They provide the CAS and RAS signal for external RAM, the directional control signal for the RAM and the other signals as shown.

4. SYNCHRONIZATION BETWEEN FASTER CYCLES AND SLOWER CYCLES

Referring again to FIG. 3 when access is needed to the slower side of the computer, the CPU waits until the appropriate time, based on the PH2 signal to access the slower sides of the computer as indicated by waveforms 46 and 47. For this reason, it is necessary for the interface circuit to keep track of the PHO signal.

There is an added dimension to keeping track of the PHO signal because of the unusual timing used in the Apple II series computers. Periodically, the PHO clock is "stretched" to provide additional counts as described in U.S. Pat. No. 4,136,359. Therefore, it is necessary for the interface circuit to keep track of these stretch cycles. The circuit for doing this is shown in FIG. 6.

The interface circuit receives a synchronization signal from the video graphics controller on line 94. The waveform for this signal is shown in FIG. 7 on line 94*a*. This signal indicates the stretched PHO signal.

Figure 7:
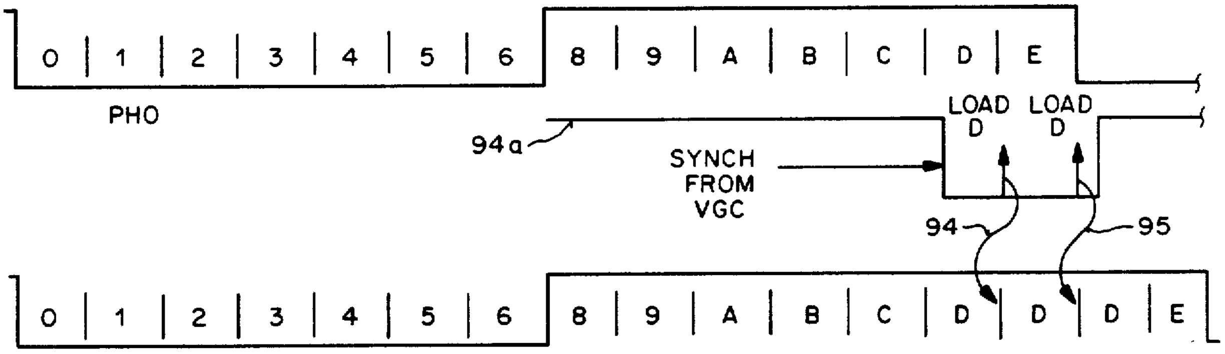
FIG. 7 is a timing diagram used to explain the operation of the circuit of FIG. 6.

The circuit of FIG. 7 includes a 4 bit counter 92 which is clocked by the 14 mHz signal. The 4 bit count at the output of this counter is connected to the state machine and logic circuits of interface circuit 10, and as will be seen, the most significant bit of this signal is in fact the PHO signal. This decoder 93 examines the 4 bits from counters and determines when a $6 count or $E count is present at the output of counter 92. When a $6 count is present, a signal is coupled to the preload logic 91 causing $8 to be loaded into the counter 92. Similarly, when decoder 93 detects a $E at counter 92, it couples a signal to the logic 91 causing $0 to be loaded into counter 92. The signal on line 94 causes a $D to be loaded into the counter 92.

Referring to FIG. 7, the uppermost waveform represents the PHO signal. Initially assume the counter 92 has all 0's and the count proceeds as shown from $0-6. When the count $6 is reached, the decoder 93 and logic 91 cause $ 8 to be loaded into counter 92 a the counter continues counting from $ 8, that is hexadecimal 9, A, B C, D and E. When $E is reached, the decoder and logic 91 cause $ 0 to be loaded into counter 92 and the waveform shown on the upper line of FIG. 7 is repeated. As is apparent, the most significant bit of the counter is in fact the PHO signal.

The stretched cycles cause the PHO signal to be extended by two cycles of the 14 mHz clock. As shown in FIG. 7, when the counter contains $D, the synchronization signal is received on line 94, indicating the stretched cycle. $D is loaded into the counter 92 for two cycles of the 14 mHz clock, and then the count proceeds to the final $E. The count within the counter 92 for these stretched cycles is shown on the lower waveform of FIG. 7 with the interaction between the synchronization signal from the video graphics controller and the logic 91 being shown by the lines 94 and 95.

Thus, a computer has been described which includes two RAMs, one of which is operated at a faster rate than the other. The interface circuit provides control for the faster and slower cycles in a manner which allows the CPU to operate a substantial portion of its time at the faster rate.

I claim:

1. A computer which provides a video signal for a display comprising:

a central processing unit (CPU) which executes a program to provide said video signal for said display;

first and second random-access memories (RAMs) couples to said CPU, both of said memories storing video data, and said CPU accessing said first RAM at a first rate and said second RAM at a second rate, said second rate being faster than said first rate;

video circuits coupled to said first and second RAM, and to said display for generating said video signal from said video data stored in said first RAM for said display, said circuits accessing said first RAM at said first rate, said video data being updated and stored in both said first RAM and said second RAM;

an interface means for providing control between said CPU and said first and second RAMs such that when said CPU is executing said program and needs to read said video data, said interface means causes said video data to read only said second RAM by said CPU thereby allowing said CPU to operate a substantial portion of its time at said second rate.

2. The computer defined by claim 1 including at least one first connector and at least one second connector, said first and second connectors being coupled to said CPU, said interface means for permitting data to be accessed at said first connector at said first rate and at said second connector at said second rate.

3. The computer defined by claim 2 including a read-only memory (ROM) coupled to said CPU and said interface means, said interface means causing said ROM to be accessed by said CPU at said second rate.

4. The computer defined by claim 3 wherin said interface means includes a decoder which decodes addresses from said CPU and from said addresses provides said control at one of said first and second rates.

5. The computer defined in claims 1 or 4 wherein said computer includes a data bus and an address bus, said CPU providing certain address signals on said data bus during predetermined periods.

6. The computer defined by claim 5 wherein said interface means includes a plurality of registers coupled to said data bus for receiving said certain addresses.

7. A computer which provides a video signal for a display comprising:

a central processing unit (CPU); a data bus coupled to said CPU;

an address bus coupled to said CPU;

a first random-access memory (RAM) coupled to said data bus and said address bus;

a second RAM coupled to said data bus said address bus, said first and second RAMs storing video data, said video data written by said CPU into said second RAM and then written into said first RAM during a shadow cycle, said CPU accessing said first RAM at a first rate and said second RAM at a second rate, said second rate being faster than said first rate;

video circuits coupled to said first and second RAM, and to said display for generating said video signal from said video data stored in said first RAM for said display, said circuit accessing said first RAM at said first rate, said video data being updated and stored in both said first RAM and said second RAM;

an interface means coupled to said data bus, said address bus, said first RAM and said second RAM, for controlling first memory cycles between said CPU and said first RAM at said first and second memory cycles between said CPU and said second RAM at said second rate;

said interface means including decoding means for decoding addresses from said CPU to select between said first and said second memory cycles such that when said CPU is executing a program and needs to update said video data, said interface means causes sia video data to be read only from said second RAM by said CPU thereby allowing said CPU to operate a substantial portion of its time at said second rate;

said interface means also including timing means for synchronizing cetain memory cells with said first RAM.

8. The computer defined by claim 7 wherein said first and second RAM are fabricated from the same dynamic access memory ports.

9. The computer defined by claim 7 wherein said video circuits include a video graphics controller which provides a timing signal to said timing means of said interface means.

10. The computer defined by claim 9 wherein said video circuits periodically have an extended cycle and wherein the occurrence of said extended cycle triggers said timing signal.

11. A computer which provides a video signal for a display comprising:

a central processing unit (CPU) which executes a program;

a data bus coupled to said CPU;

an address bus coupled to said CPU;

a first random-access memory (RAM) coupled to said data bus and said address bus;

a second RAM coupled to said data bus and said address bus, said first and said second RAMs both storing the same video data, said video data being written by said CPU into said second RAM and then into said first RAM during a shadow cycle, said CPU accessing first RAM at a first rate and said second RAM at a second rate, said second rate being faster than said first rate;

video circuits coupled to said first and second RAM, and to said display for generating said video signal from said video data stored in said first RAM for said display, said circuits accessing said first RAM at said first rate which is compatible with the video timing requirements of said computer, said video data being updated and stored in both said first RAM and said second RAM;

an interface means coupled to said data bus, said address bus, said first RAM and said second RAM, for controlling first memory cycles between said CPU and said first RAM at said first rate, and second memory cycles between said CPU and said second RAM at a second rate, said first rate being slower than said second rate;

said interface means including decoding means for decoding addresses from said CPU to select between said first and second memory cycles, and registers coupled to said decoding means and said bus for receiving certain address signals from said data bus during predetermined periods such that when said CPU is executing said program and needs to update said video data, said interface means causes said video data to be read only from said second RAM by said CPU thereby saving substantial time during updating of said display and allowing said CPU to operate a substantial portion of its time at said second rate, updated video data being written into said first and second RAMs by said CPU 12. The computer defined by claim 11 wherein a first of said registers receives signals representing locations in said first RAM into which digital signals representing a video display are written.

13. The computer defined by claim 11 wherein a second of said registers receives part of a direct memory access address.

14. The computer defined by claim 11 wherein said computer includes a plurality of slots for receiving additional circuits and a third of said registers receives signals directing access to said slots.

15. A computer comprising a central processing unit CPU);

a first random-access memory (RAM) coupled to said CPU;

a second random-access memory (RAM) coupled to said CPU, said first and said second RAMs both storing the same video data, second RAM being accessed at a faster rate as compared to said second RAM;

video circuits for providing video signals for a video display, said video signals being developed from said video data stored in said second RAM, said second RAM being coupled to said video circuits;

CPU interface means for providing control between said CPU and said first and second RAMs, said interface means providing a control signal to said CPU and said first and second RAMs to selectively control access of said CPU to said RAMs such that when said control signal is in one state said video circuitry reads said second RAM to provide said video signal to said display, and when said control signal is in another state said CPU reads said first RAM to update said video data, said CPU never reading said video data from said second RAM during the updating of said video data;

said interface means also writing said updated video data into both of said first and said second RAMs simultaneously.

* * * * *